April 14, 1970 C. R. TALMAGE 3,506,500

PRODUCTION OF FORCE-APPLYING TOOLS

Filed May 10, 1967

INVENTOR.
CHARLES ROBERT TALMAGE
BY
Hopgood & Calimafde
ATTORNEYS

United States Patent Office 3,506,500
Patented Apr. 14, 1970

3,506,500
PRODUCTION OF FORCE-APPLYING TOOLS
Charles Robert Talmage, New Canaan, Conn., assignor to New Britain Machinery Company, New Britain, Conn., a corporation of Connecticut
Filed May 10, 1967, Ser. No. 637,391
Int. Cl. C21d 1/02
U.S. Cl. 148—126    3 Claims

ABSTRACT OF THE DISCLOSURE

Force-applying hand tools, such as wrench sockets, are disclosed produced by powder metallurgy. The working portion of the tool comprises a porous sintered body of heat treatable steel composition of high strength having an average density of at least 85% of true density and having an adherent plating of a protective metal coating on the surface thereof.

---

The invention relates to force-applying tools, such as socket wrenches, pliers, parts for ratchet wrenches, and the like, and to a powder metallurgy method for producing such tools.

In the production of certain hand tools, such as wrench sockets, pliers and similar tools, generally steel bar stock is employed from which the tools are fabricated using conventional forming methods, such as drop forging and machining methods. For example, in producing a wrench socket, cylindrical bar stock is often employed which is machined into the desired configuration utilizing, for example, an automatic screw machine. The amount of machining required generally results in about 60% to 65% of the metal being recovered in the final product, the remainder being lost as machining scrap.

Certain hand tools, such as pliers, are produced by drop forging. The amount of recovered metal in the final product ranges from about 60% to 70%, the remainder being lost as flash material and due to crossing away of excess metal upon completion of the forging operation.

The steel bar stock employed in producing the foregoing type of tools is generally produced by hot rolling. Such bar stock usually has directional properties; that is to say, the physical properties in the longitudinal direction are generally higher than in the transverse direction. Thus, depending on the method of manufacture, the cleanliness of the metal, etc., such steels may not always have the desired transverse properties to meet specification requirements. Wrench sockets, for example, are usually subjected to high torque stresses in use and it is desirable that the steel from which the wrench is made have generally high but uniform physical properties in both the transverse and longitudinal directions.

It is an object of the invention to provide as an article of manufacture force-applying hand tools produced by powder metallurgy.

Another object is to provide a powder metallurgy method for producing force-applying tools characterized by an improved combination of physical properties.

A still further object is to provide a more economical and efficient method for producing hand tools.

These and other objects will more clearly appear when considered in the light of the following disclosure and the accompanying drawing, wherein.

Figure 1:
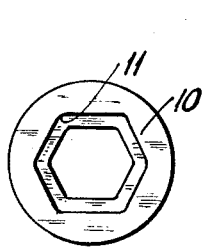
FIGS. 1 to 3 are illustrative of a hexagonal wrench socket produced in accordance with the invention.

Stating it broadly, the invention provides as an article of manufacture a force-applying tool comprising a porous sintered body of a heat treatable steel composition having a density less than true density, but which density at or near the surface of said sintered body is at least 89% of true density, the average density of the sintered body being at least 85%, and, more advantageously, at least 89%.

An advantageous feature of the tool comprising said sintered body is that, despite its porosity, it meets specification strength requirements, is generally much cleaner than steels made by the conventional methods of melting, casting and hot working, is generally free of directional properties, and moreover is more economical to produce. For example, in producing such tools utilizing powder metallurgy techniques, the metal yield in the final product is generally at least about 98% by weight of the starting material as compared to convention methods of production where a metal yield of about 65% is often considered normal. In addition, by controlling the metallurgical structure of the final product, an average density of about 85% to 97% can be utilized without substantially sacrificing the strength properties of the tool, while at the same time achieve a saving in raw material costs due to weight reduction and greatly reduced scrap loss.

In carrying the invention into practice, iron powder of high compressibility is employed to which a steel-forming ingredient is added, such as carbon with or without alloying additions, for example, nickel. Where the steel employed is plain carbon steel, the amount of carbon may range from about 0.3% to 0.8%, with the balance essentially iron. Where a nickel steel is employed, the composition may comprise about 1% to 5% nickel, about 0.3% to 0.8% carbon and the balance substantially iron. More advantageously, the composition may contain about 1.5% to 3.5% nickel, about 0.3% to 0.6% carbon and the balance essentially iron. Steels which may be employed may include, low, medium and high alloy steels, just so long as the steels are heat treatable, that is capable of being heat treated to form an austenitic decomposition product, such as pearlite (annealed), martensite (hardened) or other austenitic decomposition products. The terms "balance essentially" or "balance substantially" iron are means to include the presence of other elements normally employed in steel compositions.

A metallurgical structure found particularly advantageous for the purposes of the invention is one in which the sintered tool element has a density varying from about 85% to 97% of true density in the hardened condition, and in addition has a hardened surface zone of higher density produced by gas carburizing or by carbo-nitriding, it being understood that the term "carburized" covers the foregoing methods of surface hardening. The hardened surface advantageously has an adhering metal planting comprising a metal selected from the group consisting of Cu, Zn, Cd, Ni and Cr. The hardened surface zone of higher density is important in that it reinforces the hardened porous substrate and makes it resistant to brinelling, that is, resistant to knicking and the like, the metal plate conferring resistance to corrosion to the tool. The hardened surface of higher density is further advantageous in that it insures metal plating of high quality.

Figure 2:
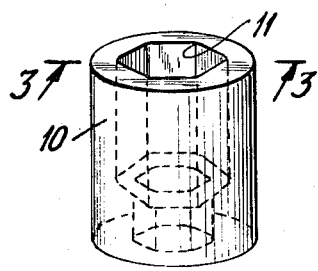
Figure 3:
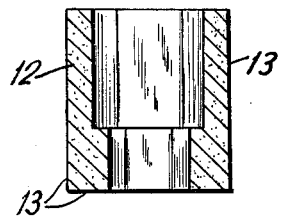

As illustrative of the invention, the following example is given:

In producing a hexagonal wrench socket of the type shown in FIGS. 1 to 3, atomized iron powder of high compressibility and average particle size of about approximately 75 microns is employed having an iron content of at least about 98%, with the balance small amounts of other ingredients, such as manganese, silicon, etc. To the iron is added 2% weight of carbonyl nickel powder of about 99.9% purity and of average particle size ranging from about 3 to 5 microns, and sufficient carbon as natural graphite (about 5 microns average size) to provide a final carbon content of about 0.3%. About 1% by weight of lithium stearate is added and the mix blended by conventional means for about one hour.

Upon completion of the mixing, a given volume of the blended powder is pressed in a double acting die having a configuration corresponding to the wrench socket of FIGS. 1 to 3. The pressure generally ranges from about 30 tons per square inch to 110 tons per square inch. In producing wrench socket having an O.D. of about 0.4375 inch, a total pressure of about 10 tons was employed which corresponded to a pressure of almost 108 tons per square inch, the green density after pressing being approximately 91%.

After pressing, the tool element is then subjected to sintering in an atmosphere of cracked ammonia at a temperature of about 2020–2080° F. for about 10 to 40 minutes, the density after sintering remaining substantially unchanged. The apparent hardness as sintered ranges from about 50 to 60 $R_B$. The tool element is thereafter subjected to heat treatment by heating it to an austenitizing temperature of about 1650° F. and holding it at temperature for from 10 to 15 minutes in an atmosphere of cracked ammonia containing about 1% by volume of propane, the propane being used to avoid decarburization and to provide a thin carburized higher density case to the porous surface of the tool. The tool is then quenched from this temperature into a bath of fast quenching oil to convert the microstructure to martensite, with the apparent hardness ranging from about 45 to 55 Rc. After the tool has been hardened, it is then drawn at 450° F. for about one hour to lower the apparent hardness to about 38 to 43 Rc.

The tool is then provided with a metal plating comprising a metal selected from the group consisting of Cu, Zn, Cd, Ni and Cr by using conventional metal plating techniques, such as barrel or rack plating.

As will be appreciated, in carrying out the sintering and plating treatments, a plurality of tool elements would be handled at one time. Likewise, in producing the various tool parts, an automatically operable press may be employed. In sintering the parts, this may be done continuously by utilizing an endless conveyor passing through the sintering furnace.

In producing wrench sockets of the type shown in FIG. 1, it is desirable that the corners of the hex 10 have a radius of curvature 11 to avoid high stress concentration at the corners during use.

Figure 4:
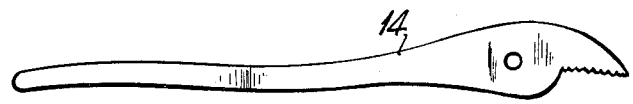
FIGS. 4 and 5 depict in plan and elevation a plier element.
Figure 5:
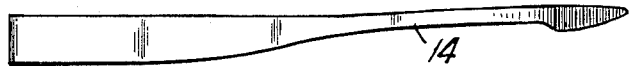

Referring to FIG. 3, a cross section of the socket wrench is shown having a porous substrate 12 and a metal coating 13. FIGS. 4 and 5 are illustrative of another force-applying tool showing in plan and elevation one-half of a pair of pliers 14 produced in a similar manner as the socket wrench of FIGS. 1 to 3.

As has been stated hereinbefore, one of the advantages of the invention is that it enables the production of tools having uniform properties in both the transverse and longitudinal direction as compared to conventionally produced tools. In addition, the metallographic structure of the tool produced by the invention is generally cleaner. As illustrative of the foregoing, reference is made to FIGS. 6 and 7 which depict the metallographic structure of a conventionally produced tool (FIG. 6) and the tool produced by the invention (FIG. 7).

Figure 6:
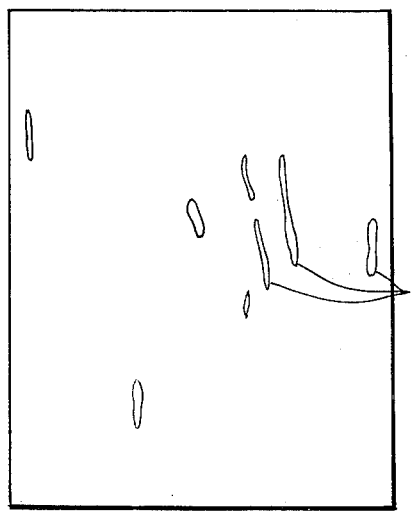
FIGS. 6 and 7 are reproductions of photomicrographs comparing the metallographic structure of a steel composition produced conventionally with one produced by power metallurgy.

Referring to FIG. 6, which is a representation of a micrograph of a screw machine blank taken at 200× diameter, elongated non-metallic inclusions are shown running in a longitudinal direction. Generally, such structures have directional longitudinal properties at the sacrifice of transverse properties. Such direction properties in a wrench socket results in reduced torque strength.

Figure 7:
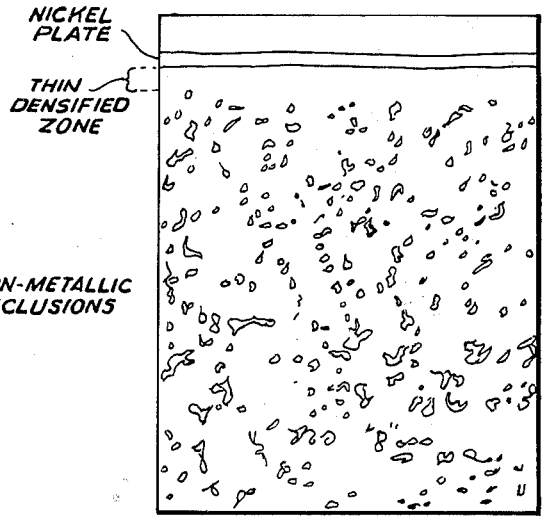

On the other hand, FIG. 7, which is a representation of a micrograph of a sintered blank taken at 200× diameter, shows no elongated inclusion in the substantially uniform structure. It will be noted from FIG. 7 that there is a thin densified zone below the metal plate.

Broadly speaking, the method aspect of the invention comprises (1) providing a batch of metal powder comprising a heat treatable steel composition containing about 0.3% to 0.8% carbon; (2) confining a measured quantity of the powder into a cavity of a die having a final configuration of the hand tool element desired; (3) pressing the confined powder at a pressure ranging from about 30 to 110 t.s.i.; the pressure being selected to provide a pressed density of at least 85% of true density; (4) sintering the element at an elevated temperature e.g. about 1800° to 2200° F. or more, advantageously from about 2010° F. to 2080° F., in a protective atmosphere that does not adversely affect the carbon content of the steel for a time sufficient to produce a high strength product; (5) heat treating the sintered product by heating it to an austenitizing temperature in an atmosphere protective to the carbon content of the steel, preferably an atmosphere protective to the carbon content of the steel, preferably an atmosphere containing a small amount of carburizing gas; (6) quenching the product at a rate to form martensite followed by tempering; and (7) then plating the surface of the heat treated porous tool body with a protective metal coating, such as a metal coating selected from the group consisting of Cu, Zn, Cd, Ni and Cr.

Microscopic examination of etched samples of sintered nickel steel sockets produced in accordance with the invention reveals a generally heterogeneous structure characterized by a dispersion throughout the steel matrix of a plurality of bright nickel-rich areas. Tests have indicated that sintered tools having such nickel alloy structures exhibit good mechanical properties.

What is claimed is:

1. In a method for producing a hand tool by powder metallurgy from a heat treatable steel composition containing about 0.3% to 0.8% carbon and the balance essentially iron, by forming a pressed shape of said composition and sintering it at an elevated temperature to an average density of at least 85%, the improvement wherein the sintered shape is carburized at an austenitizing temperature to decrease surface porosity and increase the density at and near the surface to at least 89%, and wherein said carburized shape is quenched, tempered and thereafter plated with a metal from the group consisting of Cu, Zn, Cd, Ni and Cr.

2. The method of claim 1, wherein the steel composition contains about 1% to 5% nickel.

3. The method of claim 2, wherein the steel composition contains about 1.5% to 3.5% nickel and about 0.3% to 0.6% carbon.

References Cited

UNITED STATES PATENTS

| | | | |
|---|---|---|---|
| 2,826,805 | 3/1958 | Probst | 148—126 X |
| 3,360,347 | 12/1967 | Todd | 75—222 X |

CARL D. QUARFORTH, Primary Examiner

A. J. STEINER, Assistant Examiner

U.S. Cl. X.R.

75—208, 214, 222, 224